(12) United States Patent
Abdel-Aty et al.

(10) Patent No.: US 11,908,317 B2
(45) Date of Patent: Feb. 20, 2024

(54) REAL-TIME TRAFFIC SAFETY MANAGEMENT SYSTEM

(71) Applicant: University of Central Florida Research Foundation, Inc., Orlando, FL (US)

(72) Inventors: Mohamed Abdel-Aty, Orlando, FL (US); Ou Zheng, Orlando, FL (US); Yina Wu, Orlando, FL (US); Jinghui Yuan, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 512 days.

(21) Appl. No.: 17/248,142

(22) Filed: Jan. 11, 2021

(65) Prior Publication Data

US 2021/0217307 A1    Jul. 15, 2021

Related U.S. Application Data

(60) Provisional application No. 62/959,473, filed on Jan. 10, 2020.

(51) Int. Cl.
*G08G 1/01* (2006.01)
*G06N 3/049* (2023.01)
(Continued)

(52) U.S. Cl.
CPC ........... *G08G 1/0145* (2013.01); *G06N 3/049* (2013.01); *G06N 7/01* (2023.01); *G08G 1/0133* (2013.01); *G08G 1/081* (2013.01)

(58) Field of Classification Search
CPC ....... G08G 1/096775; G08G 1/096725; G08G 1/096741; G08G 1/164; G08G 1/096844;
(Continued)

(56) References Cited

U.S. PATENT DOCUMENTS 9,846,999 B1 * 12/2017 Pickover ........... H04M 1/72403
10,453,337 B2 * 10/2019 Anastassov ...... G08G 1/096758
(Continued)

OTHER PUBLICATIONS

Abdel-Aty et al., Dynamic Variable Speed Limit Strategies for Real-Time Crash Risk Reduction on Freeways. Transp. Res. Rec. J. Transp. Res. Board. 2008. vol. 2078: 108-116.
(Continued)

*Primary Examiner* — Maceeh Anwari
*Assistant Examiner* — Aarron E Santos
(74) *Attorney, Agent, or Firm* — Owen G. Behrens; Paul Murty; Smith & Hopen, P.A.

(57) ABSTRACT

A real-time traffic safety visualization and management system using traffic data, social media data, weather data, and other similar data enable proactive decisions for reducing the number of traffic incidents or mitigating their severity. The system utilizes predictive algorithms in a hybrid framework to diagnose real-time traffic safety conditions. Meanwhile, Pro-active Traffic Management (PATM) Strategies are provided by the system for the predicted high-risk locations. Moreover, through the visualization and management system, various countermeasures are considered and tested for decision makers, such that one or more of the most effective countermeasures are recommended within a given area to improve traffic safety thereof.

15 Claims, 18 Drawing Sheets

(51) Int. Cl.
*G08G 1/081* (2006.01)
*G06N 7/01* (2023.01)

(58) Field of Classification Search
CPC .......... G08G 1/0968; G08G 1/01; G08G 1/07; G08G 1/096805; G08G 1/096811; G08G 1/207; G08G 1/0112; G08G 1/0133; G08G 1/0129; G08G 1/0141; G08G 1/096716; G08G 1/0116; G08G 1/202; G08G 1/0145; G08G 1/096783; G08G 1/166; G08G 1/20; G08G 1/012; G08G 1/08; G08G 1/0965; G08G 1/205; G08G 1/017; G08G 1/04; G08G 1/09675; G08G 1/096791; G08G 1/096816; G08G 1/163; G08G 1/005; G08G 1/0967; G08G 1/144; G08G 1/162; G08G 1/09623; G08G 1/096758; G08G 1/143; G08G 1/146; G08G 1/147; G08G 1/148; G08G 1/168; G08G 1/00; G08G 1/0125; G08G 1/0137; G08G 1/0175; G08G 1/052; G08G 1/087; G08G 1/0962; G08G 1/09626; G08G 1/096827; G08G 1/096855; G08G 1/054; G08G 1/096733; G08G 1/123; G08G 1/141; G08G 1/167; G06N 3/045; G06N 20/00; G06N 3/08; G06N 20/10; G06N 7/01; G06N 3/04; G06N 3/088; G06N 5/025; G06N 3/044; G06N 3/084; G06N 3/006; G06N 3/008; G06N 3/043; G06N 3/047; G06N 3/063; G06N 3/02; G06N 5/022

See application file for complete search history.

(56) References Cited

U.S. PATENT DOCUMENTS

| | | | | |
|---|---|---|---|---|
| 11,049,389 B2* | 6/2021 | Madduri | ................ | G08G 1/012 |
| 11,393,333 B2* | 7/2022 | Lau | ...................... | H04L 67/306 |
| 11,495,124 B2* | 11/2022 | Lau | ...................... | G06T 19/006 |
| 11,587,049 B2* | 2/2023 | Hussaini | ................ | G07B 15/00 |
| 2013/0179067 A1* | 7/2013 | Trowbridge | ....... | G01C 21/3484 |
| | | | | 701/410 |
| 2016/0104377 A1* | 4/2016 | French | ................... | G08G 1/091 |
| | | | | 701/117 |
| 2016/0334235 A1* | 11/2016 | Gustafson | .......... | G01C 21/3492 |
| 2020/0079380 A1* | 3/2020 | Yu | ....................... | B60W 60/001 |
| 2020/0236120 A1* | 7/2020 | Monteil | ............. | H04L 41/5054 |
| 2020/0364508 A1* | 11/2020 | Gurel | .................... | G06V 20/41 |

OTHER PUBLICATIONS

Abdel-Aty and Gayah. Real-Time Crash Risk Reduction on Freeways Using Coordinated and Uncoordinated Ramp Metering Approaches. J. Transp. Eng. 2010. vol. 136 (No. 5): 410-423.

Shi and Abdel-Aty. Big Data applications in real-time traffic operation and safety monitoring and improvement on urban expressways. Transportation Research Part C: Emerging Technologies. 2015. vol. 58: 380-394.

Wang et al., Real-time crash prediction for expressway weaving segments. Transportation Research Part C: Emerging Technologies. 2015. vol. 61: 1-10.

Wang et al., Predicting crashes on expressway ramps with real-time traffic and weather data. Transportation Research Record: Journal of the Transportation Research Board. 2015. vol. 2514: 32-38.

Wang et al., Implementation of Active Traffic Management Strategies for Safety on Congested Expressway Weaving Segments. Transp. Res. Rec. 2017. vol. 2635: 28-35.

Yuan and Abdel-Aty. Approach-Level Real-Time Crash Risk Analysis for Signalized Intersections. Accident Analysis & Prevention. 2018. vol. 119: 274-289.

Yuan et al., Real-Time Crash Risk Prediction Using Long Short-Term Memory Recurrent Neural Network. Transportation Research Record: Journal of the Transportation Research Board. 2019. vol. 2673 (No. 4): 314-326.

Yuan et al., Utilizing bluetooth and adaptive signal control data for real-time safety analysis on urban arterials. Transportation Research Part C: Emerging Technologies. vol. 97: 114-127.

* cited by examiner

Real Time Raw Data Server

Raw Data

| Sunguide™ |
|---|
| linkNetID |
| Timestamp |
| Speed |
| Occupancy |
| Volume |

| Intelligent Transportation Systems Integration Quality and Analysis |
|---|
| Approach_ID |
| Timestamp |
| totalVolume |
| greenOccupancy |
| redOccupancy |
| Speed |
| countArrivalOnGreen |
| countArrivalOnRed |
| rightTurnOnRed |
| greenTime |

| Weather Data |
|---|
| Timestamp |
| weatherType |
| Visibility |
| Precipitation |
| Humidity |

Base Map

| Freeway Basic Segment |
|---|
| segmentId |
| linkNetID |
| laneCount |
| spdLimit |
| segType |
| upSegment |
| downSegment |
| roadway |

| Freeway Weaving Segment |
|---|
| segmentId |
| linkNetID |
| laneCount |
| spdLimit |
| segType |
| upSegment |
| downSegment |
| roadway |
| weaveLC |
| nwi |
| weaveOn |
| weaveOff |

| Freeway Ramp |
|---|
| segmentId |
| linkNetID |
| laneCount |
| spdLimit |
| segType |
| upSegment |
| downSegment |
| roadway |
| rmpTypeCode |

| Arterial Segment |
|---|
| segmentId |
| linkNetID |
| laneCount |
| spdLimit |
| segType |
| upSignal |
| downSignal |
| direction |

| Intersection |
|---|
| intersectionId |
| eAppSegID |
| wAppSegID |
| nAppSegID |
| sAppSegID |
| eApproachID |
| wApproachID |
| nApproachID |
| sApproachID |
| majorDir |

Fig. 5A

Real Time Filtered Data Server

Freeway/Expressway Data Filter (Sunguide™)

Freeway Segment
- segmentId
- Timestamp
- Segment_volume
- Up_volume
- Down_volume
- Segment_avg_spd
- Up_avg_spd
- Down_avg_spd
- Segment_std_spd
- Up_std_spd
- Down_std_spd
- Down_congest_index
- Crash_risk
- Severe_crash_risk

Weaving Segment
- segmentId
- Timestamp
- Volume
- Up_avg_spd
- Down_avg_spd
- Spd_diff
- Up_std_spd
- Down_std_spd
- Surface_cond
- Max_weaving_len
- Lane_config
- Crash_risk
- Severe_crash_risk

Ramp
- segmentId
- Timestamp
- Volume
- Avg_spd
- Std_spd
- On_off_ramp
- Visibility
- Crash_risk
- Severe_crash_risk

Arterial Data Filter (Sunguide™ and ITSIQA)

Road Segment
- segmentId
- Timestamp
- Avg_spd
- Std_spd
- Up_th_vol
- Up_lt_vol
- Down_th_vol
- Down_lt_vol
- Up_th_green_ratio
- Up_lt_green_ratio
- Down_th_green_ratio
- Down_lt_green_ratio
- Up_th_aog
- Up_lt_aog
- Up_th_aoy
- Up_lt_aoy
- Down_th_aog
- Down_lt_aog
- Down_th_aoy
- Down_lt_aoy
- Crash_risk
- Severe_crash_risk

Intersection
- intersectionId
- Timestamp
- Major_avg_spd
- Major_std_spd
- Major_volume
- Major_th_volume
- Major_lt_volume
- Major_aog
- Major_aoy
- Major_lt_green_ratio
- Major_th_green_ratio
- Minor_avg_spd
- Minor_std_spd
- Minor_volume
- Minor_th_volume
- Minor_lt_volume
- Minor_aog
- Minor_aoy
- Minor_lt_green_ratio
- Minor_th_green_ratio
- Crash_risk
- Severe_crash_risk

Fig. 5B

| | |
|---|---|
| "Up" = Upstream | "Config" = Configuration |
| "Down" = Downstream | "Th" = Through |
| "Avg" = Average | "Lt" = Left turn |
| "Std" = Standard deviation | "Vol" = Volume |
| "Spd" = Speed | "Aog" = Arrival on green |
| "Congest" = Congestion | "Aoy" = Arrival on yellow |
| "Diff" = Difference | "Major" = Major approaches |
| "Cond" = Condition | "Minor" = Minor approaches |
| "Len" = Length | |

Fig. 5C

Table 3: Crash Severity Distributions for Different Facility Types

| Area Type | Urban | | | | | | | | | Rural | | | | | | | | |
|---|---|---|---|---|---|---|---|---|---|---|---|---|---|---|---|---|---|---|
| Problematic Crash Type | Angle | | | Rear-end | | | Sideswipe | | | Angle | | | Rear-end | | | Sideswipe | | |
| Crash Severity | Fat. | Inj. | PDO | Fat. | Inj. | PDO | Fat. | Inj. | PDO | Fat. | Inj. | PDO | Fat. | Inj. | PDO | Fat. | Inj. | PDO |
| Percentages (Freeways) | 0.5 | 42.1 | 57.4 | 0.3 | 28.7 | 71 | 0.5 | 22.8 | 76.7 | 0.5 | 42.1 | 57.4 | 2.1 | 32.3 | 65.6 | 0 | 20 | 80 |
| Percentages (Arterials) | 0.4 | 29.1 | 70.5 | 0.3 | 27.4 | 72.2 | 0.3 | 20.5 | 79.2 | 4.2 | 54.2 | 42.7 | 0.2 | 13.1 | 86.8 | 0 | 20.3 | 79.7 |
| Percentages (Intersections) | 0.7 | 31.4 | 67.9 | 0.2 | 25.9 | 73.9 | - | - | - | 0.7 | 31.4 | 67.9 | 0.2 | 25.9 | 73.9 | - | - | - |

REAL-TIME TRAFFIC SAFETY MANAGEMENT SYSTEM

CROSS-REFERENCE TO RELATED APPLICATIONS

This nonprovisional application is a continuation of and claims priority to provisional application No. 62/959,473, entitled "Real-time traffic safety management system," filed Jan. 10, 2020, by the same inventors.

BACKGROUND OF THE INVENTION

1. Field of the Invention

This invention relates, generally, to traffic management systems. More specifically, it relates to real-time traffic safety management systems using real-time analysis of multiple types of data including traffic data to proactively prevent traffic incidents, or at least mitigate their severity.

2. Brief Description of the Prior Art

With increasing traffic traveling on public roads worldwide, and particularly in the United States, static traffic management systems are quickly becoming outdated and obsolete. Under such static traffic management systems, increased road demands result in stagnant traffic patterns, often resulting in more numerous traffic incidents on affected roads. Traditional traffic management systems often rely on retroactive changes made in response to captured data; however, such retroactive changes do not provide the automated, real-time solutions that the dynamic nature of traffic patterns require, and thus fail to provide adequate solutions to traffic issues. As such, the systems constantly require retroactive modifications and fine-tuning after traffic incidents occur, resulting in dangerous road conditions and traffic system inefficiencies.

Accordingly, what is needed is a dynamic, real-time traffic safety management system to provide proactive solutions. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a real-time traffic safety management system based on real-time safety analysis algorithms and Pro-active Traffic Management (PATM) strategies is now met by a new, useful, and nonobvious invention.

The novel method includes a step of receiving, on a central server, and aggregating, via the server, a plurality of real-time data including traffic data, satellite imagery data, and weather data, and can also include social media data and closed circuit television data. The plurality of real-time data relates to a segment of a traffic system and a surrounding area. A base map is build displaying the segment of the traffic system, and graphical depictions of the real-time data are overlayed on the base map. In an embodiment, the plurality of real-time data is filtered prior to the step of building the base map, and the filtered and unfiltered data can each be processed prior to building the base map.

The method includes a step of identifying, based on the graphical depictions, one or more likely areas of the base map that represent a likelihood of a traffic event. The identification is based in part on calculating a statistical likelihood of the traffic event based on a statistical model selected from the group consisting of a binary logistic model, a conditional logistic model, a Bayesian conditional logistic model, and a Bayesian random parameter/effect logistic model. In an embodiment, the statistical calculation includes a step of using an undersampling correction. In addition, a deep learning model, such as an artificial neural network, a recurrent neural network, and a long short-term memory model, is simultaneously used to identify a pattern-based likelihood of the traffic event. A result of each of the statistical model and the deep learning model are combined to generate a hybrid model representing the likelihood of the traffic event on the base map.

The method includes a step of outputting a suggested alteration of a traffic pattern to reduce the likelihood of the traffic event. The suggested alteration is based on a step of utilizing the hybrid model as an input to a calculation of the suggested alteration. A plurality of countermeasures that are stored in a database are fit over the base map for further analysis. In an embodiment, the countermeasures include changing a speed limit, adjust a ramp metering, and providing a queue warning. A difference between each of the plurality of countermeasures and the hybrid model is calculated by subjecting each of the plurality of countermeasures. In an embodiment, an estimated monetary benefit of implementing at least one of the plurality of countermeasures within the segment of the traffic system can be calculated. At least one of the plurality of countermeasures is selected as the suggested alteration of the traffic pattern to reduce the likelihood of the traffic event. The suggested alteration of the traffic pattern is then graphically displayed on the base map.

The novel system includes a data collection server in communication with a first raw data server. The first raw data server receives a plurality of raw data from the data collection server. A first data filter server is in communication with the first raw data server, and is configured to receive the plurality of raw data from the first raw data server and filter the plurality of raw data to create a plurality of filtered data. An action database server is in communication with the first data filter server. The action database server receives the plurality of filtered data from the first data filter server and compares the plurality of filtered data with a plurality of historic data to output a suggested dataset from the plurality of filtered data. A second raw data server is in communication with each of the action database server and a second data filter server. The second raw data server receives the suggested dataset from the action database server and transmits the suggested dataset to the second data filter server real-time database server including a base map of a segment of a traffic system. A real-time database server, including a base map of a segment of a traffic system, is in communication with the second data filter server. The real-time database server receives a filtered portion of the suggested dataset from the second data filter server. A web server is in communication with the real-time database server. The web server includes a graphical user interface having a real-time display controller that is configured to receive an input from a user. The web server receives a final dataset from the real-time database, which one or more real-time data points related to the segment of the traffic system. The web server displays the final dataset overlayed on the base map, thereby displaying a suggested countermeasure implementable on the segment of the traffic system to improve a traffic pattern thereof.

An object of the invention is to provide a safety visualization system that utilizes real-time and historical data to efficiently predict traffic events via calculations and suggest traffic safety changes to improve automobile flow and reduce the number of traffic incidents, while employing an easy-to-navigate and effective graphical user interface.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 5A depicts an example of a database design for crash risk prediction, particularly showing a real-time raw data server, in accordance with an embodiment of the present invention.

FIG. 5B depicts an example of a database design for crash risk prediction, particularly showing a real-time filtered data server, in accordance with an embodiment of the present invention.

FIG. 5C depicts a legend of the terms used in FIGS. 5A-5B, in accordance with an embodiment of the present invention.

FIG. 11 is a table depicting crash severity distributions for different facilities, used in the calculation and evaluation of countermeasures, in accordance with an embodiment of the present invention.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Figure 1A:
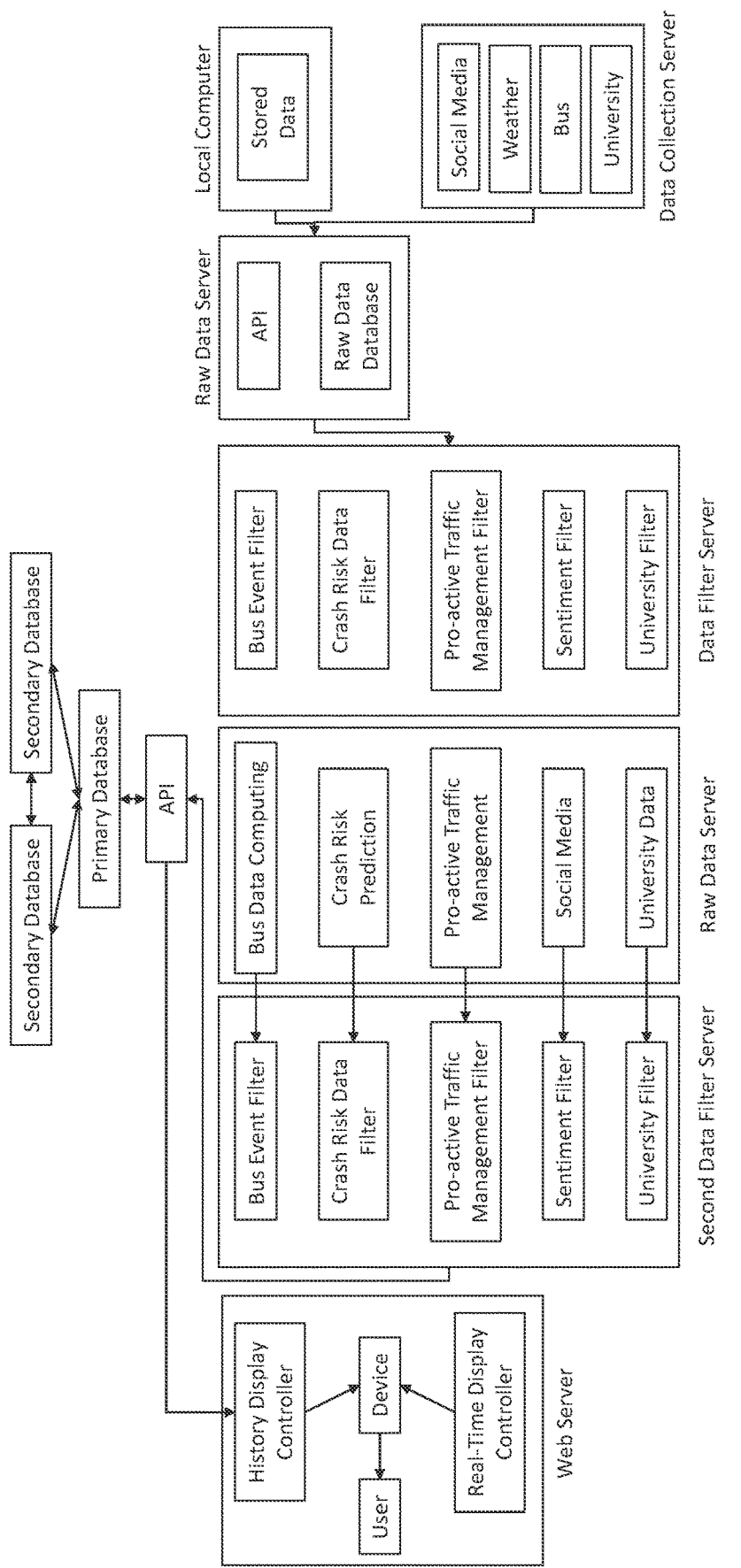
FIG. 1A is a graphical depiction of the system architecture in accordance with an embodiment of the present invention.
Figure 1B:
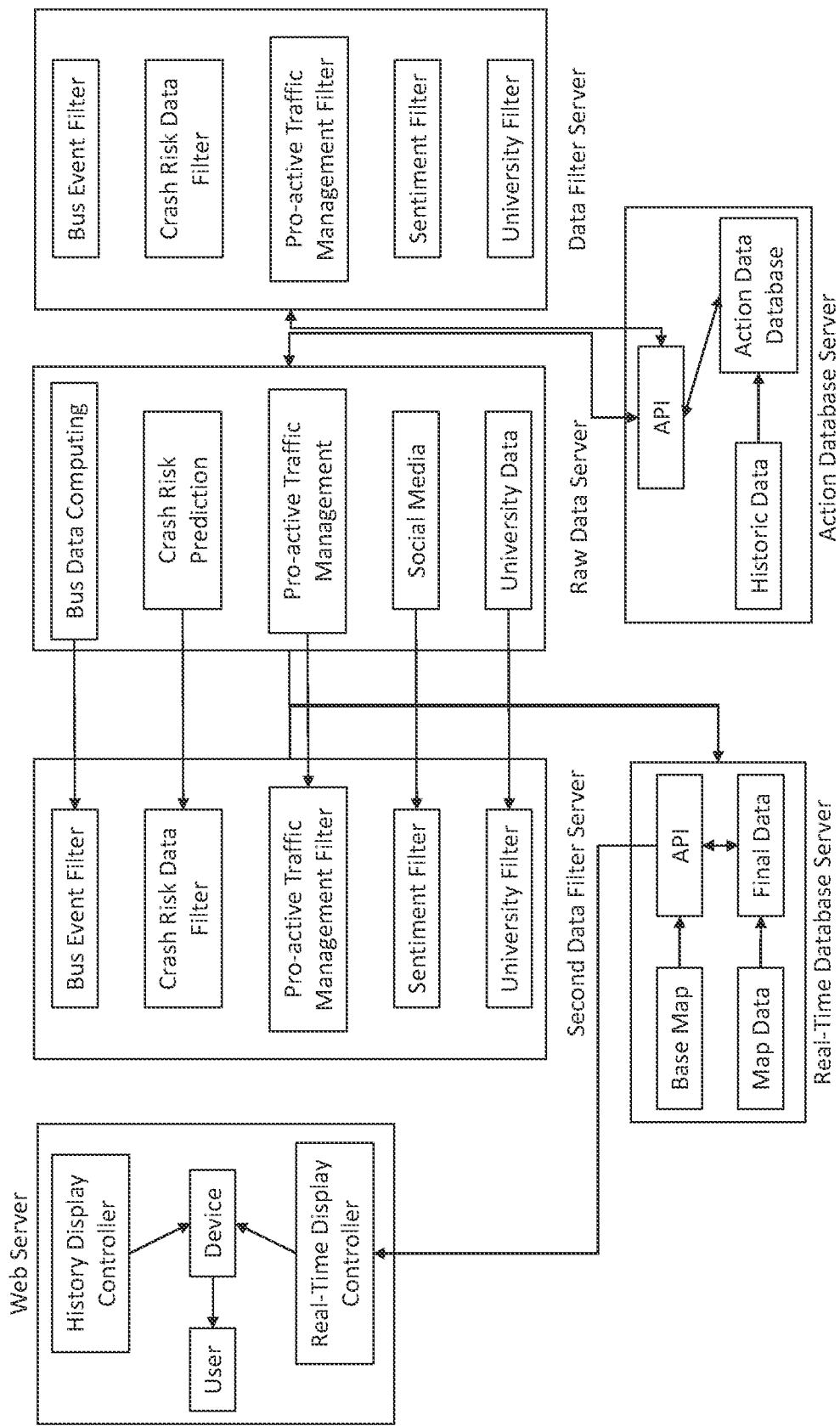
FIG. 1B is a graphical depiction of the system architecture of FIG. 1A, particularly showing the data transfer between real-time and action database servers.

The present invention includes the obtaining of real-time data and use of the real-time data to make predictions about traffic patterns and dynamically change traffic systems in response to the predicted traffic patterns, thereby implementing a real-time traffic management system. The system includes 5 main functions: real-time crash prediction and proactive traffic management (PATM) based on Artificial Intelligence (AI) technologies; historical crash diagnostics; high-risk diagnostics; floating/connected vehicles; and information for public users. The databases and servers are utilized to archive and process the raw input data to fulfill the functions. FIGS. 1A-1B show the system structure, including a load balancer and web server, a server running environment, a database, and four customized APIs (application programming interfaces) used as an interface between the servers and databases. The input data is filtered on the servers before the data is used for different algorithms. Table 1 below shows examples of databases and servers implemented in the system.

TABLE 1

Databases and Servers

| | Functions | Description | Count |
|---|---|---|---|
| Databases | Real-time raw data | Archive real-time data | 1 |
| | Real-time action data | Archive last 10 minutes' real-time data (first-in, first out (FIFO)) | 1 |
| | Filtered data | Filtered data from action database | 1 |
| | Filtered display data | For front-end display | 2 |
| | Static data | Includes base map, CMF (crash modification factor), etc. | 1 |
| | Historical data | Archive historical crash risk and PATM data | 1 |
| Servers | Data collector servers | Django ® server running Python ® code for data collection; Windows Server running C# code query data from FDOT's SunGuide ™ traffic management system | 2 |
| | Data filter servers | Processing last 10 minutes data; Processing web ready data | 2 |
| | Data processing servers | Save last 30 minutes data from raw data | 1 |
| | Web server | Host website | 1 |
| | MongoDB ® cluster server | For PATM/crash risk raw data | 4 |

Data Capture

The system uses real-time data including traffic data, signal data, CCTV data, GPS location-based data and other satellite imagery, social media data, individual user-based data (including monitors in communication with individual automobile units), weather data, and other data useful in predicting traffic patterns.

Interface

Figure 2:
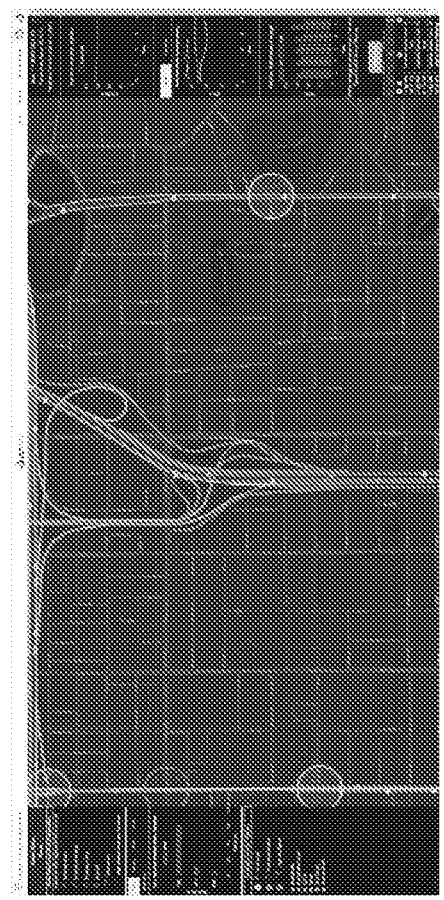
FIG. 2 is an example of an operator/user-facing graphical user interface showing traffic patterns and crash risks by utilizing the system in accordance with an embodiment of the present invention.
Figure 3:
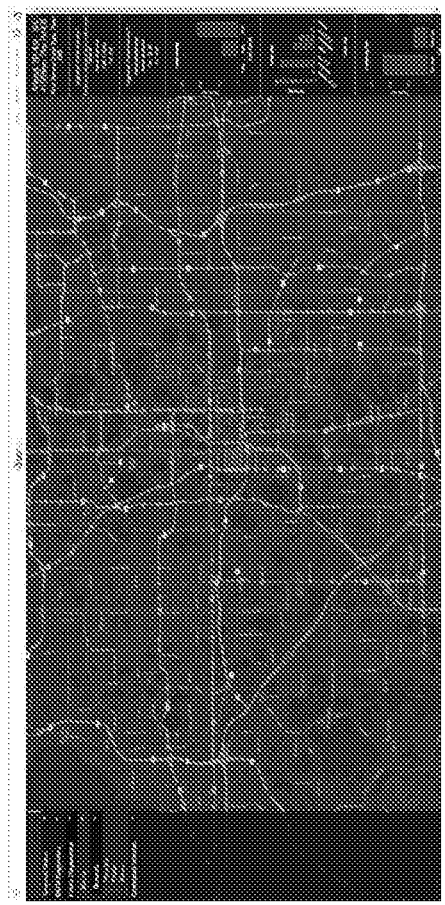
FIG. 3 is an example of decision-maker-facing graphical user interface showing crash network screening and countermeasure recommendation by utilizing the system in accordance with an embodiment of the present invention.
Figure 4:
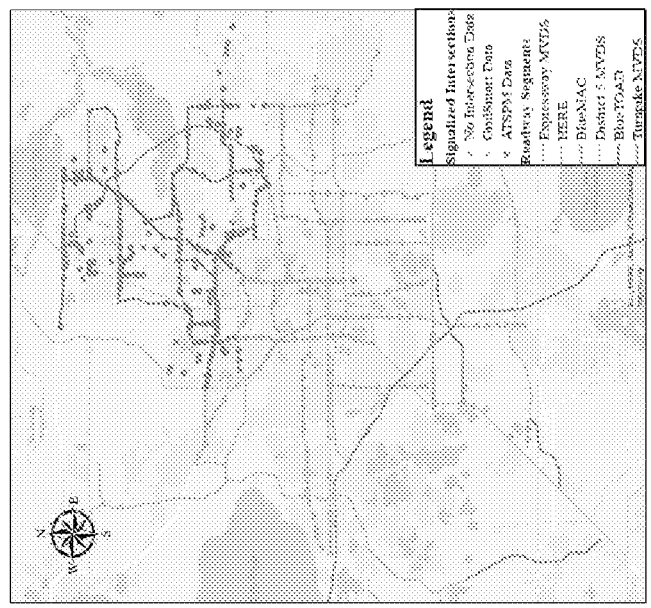
FIG. 4 is an example of a base map including data points that can be used as an underlying base map for system predictions.

FIGS. 2-3 depict examples of user interfaces for operation of the system (FIG. 2) and decision-making within the system (FIG. 3), including real-time traffic information, high-risk locations, critical driving events, high or severe crash risk locations, and other information-based graphical user interface-based graphs aimed at improving user decision-making. In addition, the system displays plots of temporal safety conditions based on actual crashes, predicted crashes, and critical driving events, which will be described in greater detail below. To extend the scalability of the real-time system, the base map is built on underlying data maps where the locations of all the available detectors and their corresponding segments or intersections are included. Since this system aims to analyze the traffic condition and identify crash-prone locations, there modifications must be implemented to improve the interpretation of real-time data and the related predictions within the management system. For example, the crash prediction algorithms are usually employed based on the real-time traffic data of not only the target segment of the traffic management system, but also the upstream and downstream segments. Therefore, both the upstream and downstream information must be added to the base map. Roadway characteristics may also be added in addition to corrections and improvements to the base map. In an example, shown in FIG. 4, after cleaning and processing, the final map included 938 freeway basic segments, 31 freeway weaving segments, 294 freeway ramps, 1367 arterial segments, and 514 signalized intersections.

Data Filtering

Data filters play an important role in big-data analyses. In general, at least one data filter is added for each type of data source in order to process and change it to usable format.

FIGS. 5A-5C shows an example of a detailed database design of the real-time data filter for crash prediction. In general, two servers are built in this section of the system for processing raw data and filtered data. In the raw data server, three kinds of external raw databases are connected, and all the available data are uploaded in real-time to the raw data server. The database contains data from many sources, including from freeways/expressways and several major arterials, as well as real-time weather data including weather type, visibility, precipitation, and humidity. In addition, the attribute tables of five types of roadway facilities are stored in the raw data server to link the roadway facilities and the corresponding real-time data sources. For example, for the "segmentId" of "2169", the corresponding real-time traffic data should be acquired from the "linkNetId" of "969 CFX", and the upstream and downstream traffic data could be queried from the "linkNetId" of "1139 CFX" and "1140 CFX". All these relationships between roadway facilities and real-time databases are recorded in the base map. With respect to the filtered data server, five databases are created for five roadway facilities, separately. For every type of roadway facility, the real-time filtered data are aggregated for five minutes and updated every minute.

Real-Time Crash Prediction

Figure 6A:
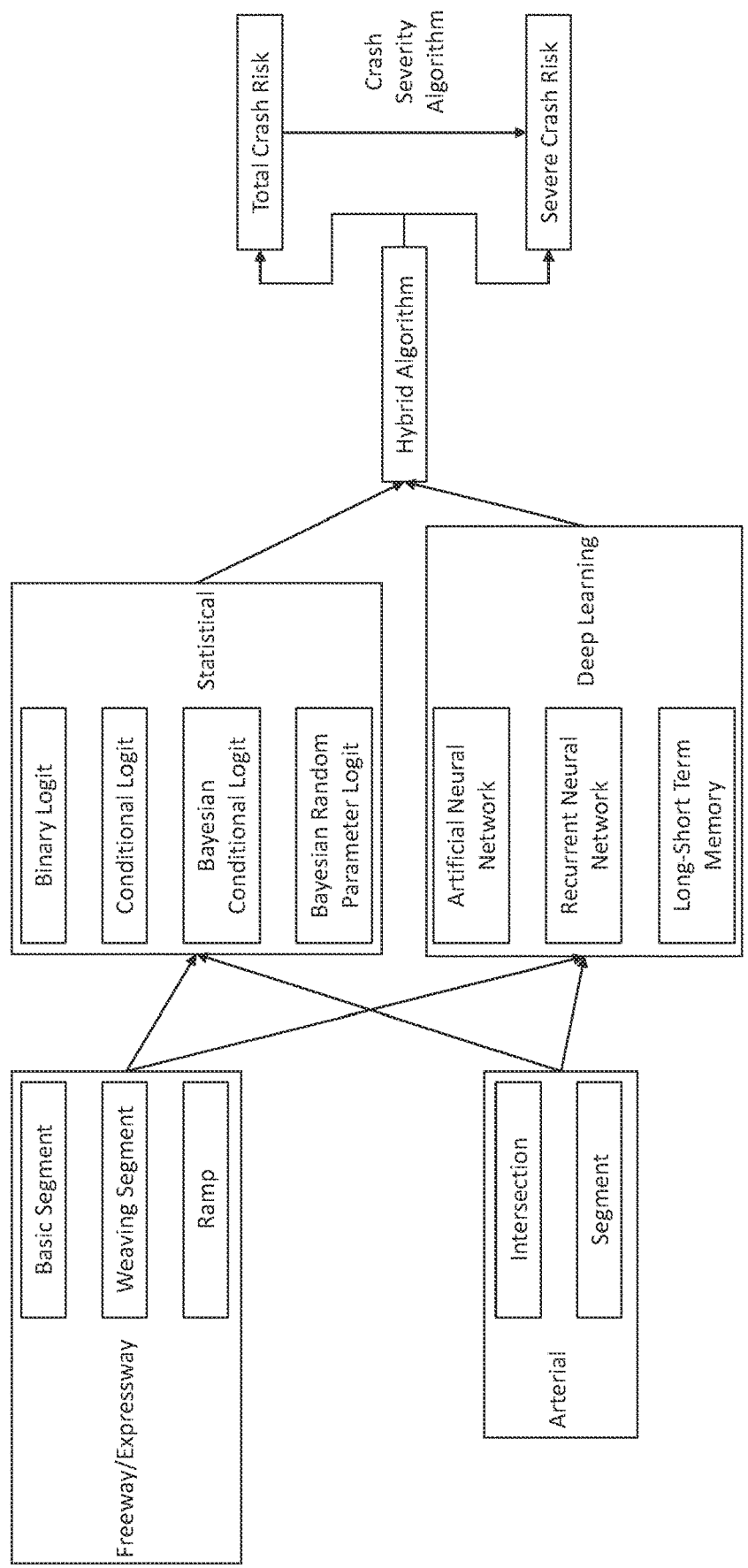
FIG. 6A depicts and embodiment of the system framework including facility-specific real-time crash risk prediction algorithms.

FIG. 6A depicts an example of the system framework of real-time crash prediction algorithms, which are separated into two classifications of roadway facilities, i.e., freeways/expressways and arterials. In addition to the basic segments, all special locations along freeways/expressways (i.e., weaving segments and ramps) and arterials (i.e., signalized intersections) are also considered with specific algorithms. With respect to the algorithms, two categories of algorithms are employed in real-time crash prediction studies: statistical/Bayesian methods and deep learning algorithms. As crash risk analysis is a typical binary classification problem, statistical methods mainly include binary logit models, conditional logit models, Bayesian conditional logit models, and Bayesian random parameter/effect logit models. On the other hand, deep learning algorithms mainly include the artificial neural network, the recurrent neural network, and the long-short term memory. For every roadway type, both statistical analyses and deep learning algorithms are applied to predict the presence of real-time crashes, and then hybrid algorithms, e.g., average ensemble, weighted average ensemble, etc., are employed to combine all the prediction results into a final predicted risk score. In addition, severe crash risks are estimated based on crash severity prediction algorithms.

Figure 6B:
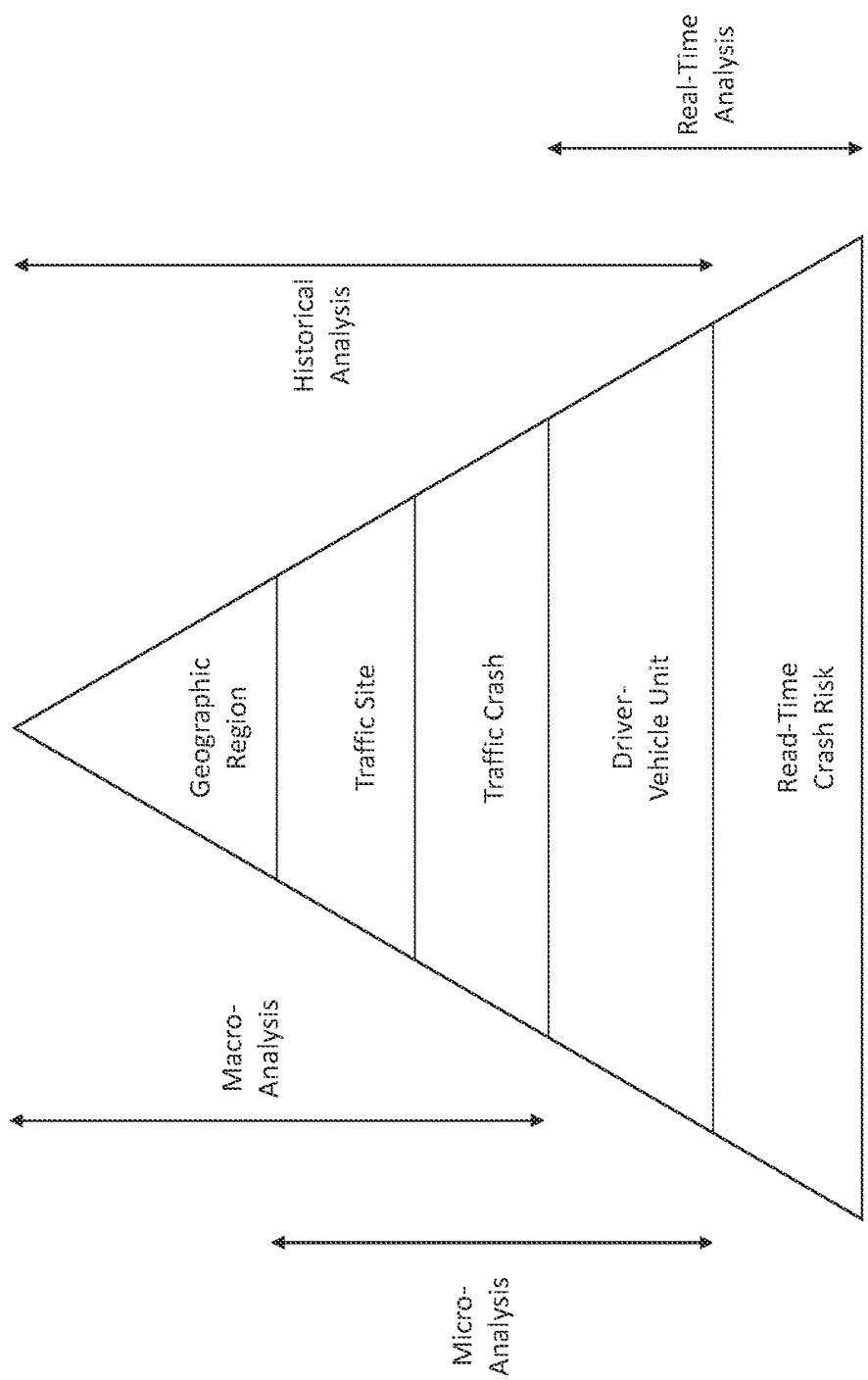
FIG. 6B depicts a five-level hierarchy of traffic safety data used in decision making for the real-time system described herein.

Considering the data and variabilities involved in the decision-making, FIG. 6B depicts an embodiment of a data hierarchy for a traffic management system. Along the vertical of this triangle is a five-level hierarchy representing various entities with temporal distribution ranging from historical safety analysis to real-time road safety analysis and with spatial distribution that includes a Geographic region level, a Traffic site level, a Traffic crash level, a Driver-vehicle unit level, and surrogate safety measures in real-time. The involvement and emphasis for different subgroups of these levels depend on different purposes and also rely on the heterogeneity examination of the crash data employed. For spatial distribution, macro-analyses focus on the top three levels, i.e. Geographic region level, Traffic site level, and Traffic crash level, while micro-analyses concern Traffic crash level and Driver-vehicle unit levels. As for temporal distribution, the top three levels (i.e., Geographic region level, Traffic site level, and Traffic crash level) can be used for historical safety diagnosis, while the lower one or two levels can be related to real-time safety evaluation.

Figure 7:
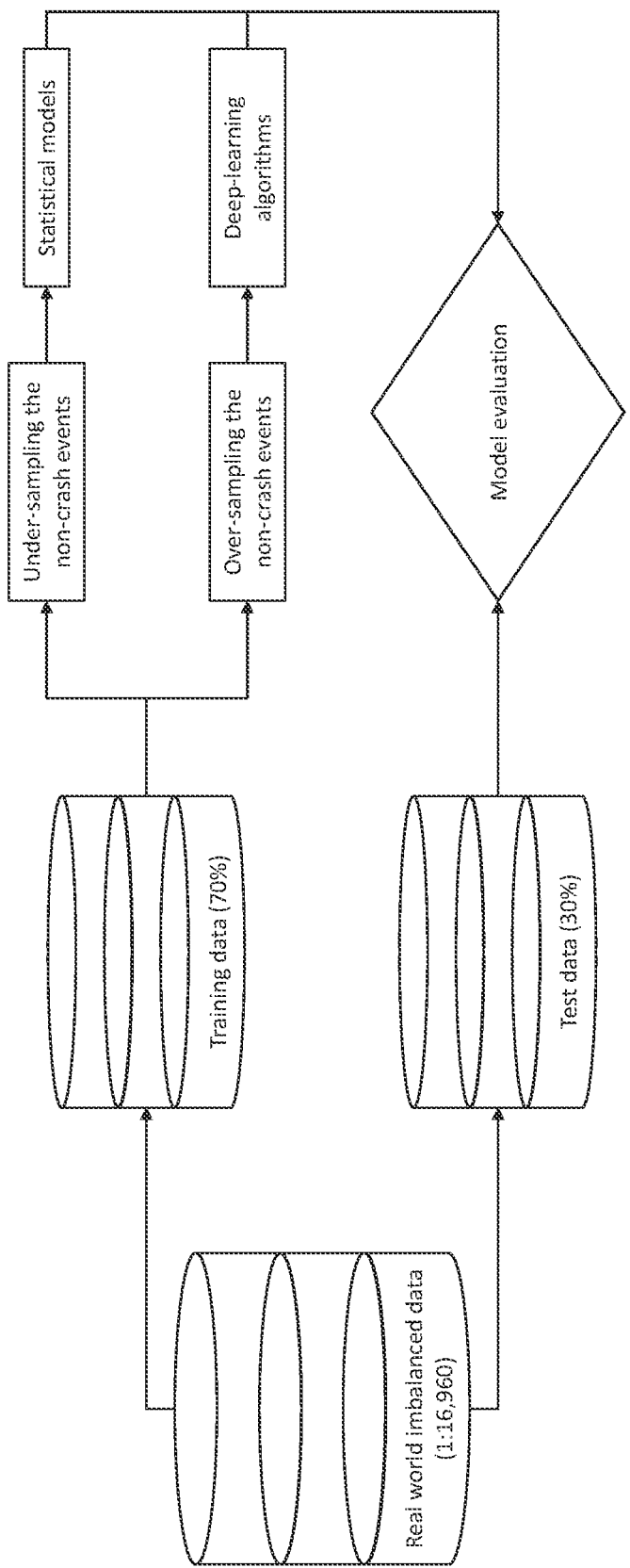
FIG. 7 is an example of a system framework calibration and evaluation procedure for real-time crash risk prediction models.

In the real world, non-crash events are much more common than crash events, and crashes should be considered as extremely rare events. Therefore, this kind of imbalanced crash and non-crash event dataset can hardly be directly utilized to calibrate models. In general, there are two kinds of sampling methods that can be applied to address this imbalance issue: (a) the under-sampling method, which aims to reduce the sample size of non-crash events to generate a relatively balanced dataset; and (b) the oversampling method, which tends to increase the sample size of crash events by using various resampling methods to create a balanced dataset. FIG. 7 depicts an example of a framework of the calibration and evaluation procedure of real-time crash prediction models. The under-sampling method is applied to calibrate the statistical models while the over-sampling method is utilized for the training of deep learning algorithms. All the models and algorithms are tested on the real-world imbalanced test dataset. It is worth noting that all the models and algorithms are aimed at predicting the crashes during the subsequent 5-10 minutes to allow time for intervention if needed, which is consistent with previous studies.

Statistical Model

With respect to this kind of typical binary classification problem, binary logistic model is selected as an example to illustrate the mechanism of crash prediction. Assuming that the crash occurrence has the outcomes $y_i=1$ (crash event) and $y_i=0$ (non-crash event) with the respective probabilities of $p_i$ and $1-p_i$, $i=1, 2, \ldots, M$. M represents the total number of samples, which equals to $N(m+1)$ in the system. The binary logistic regression can be expressed as follows:

$$y_i \sim \text{Bernoulli}(p_i) \quad (1)$$

$$\text{logit}(p_i)=\beta_0+\beta_1 X_{1i}+\beta_2 X_{2i}+\ldots+\beta_K X_{Ki} \quad (2)$$

where $\beta_0$ is the intercept; $\beta=(\beta_1, \beta_2, \ldots, \beta_K)$ is the vector of coefficients for K independent variables; $X_i=(X_{1i}, X_{2i}, \ldots, X_{Ki})$ is the vector of K independent variables for the ith observation.

Based on the above statistical model, the probability of crash occurrence ($p_i$) for the ith observation could be calculated as:

$$p_i = \frac{\exp[\beta_0 + \beta X_i]}{1 + \exp[\beta_0 + \beta X_i]} \quad (3)$$

However, the sampling strategies employed herein modified the distribution of the training dataset and consequently may result in biased predicted probability (Dal Pozzolo, et al., 2015). As demonstrated by Dal Pozzolo, et al. (2015), the biased probability should be adjusted based on the sample rate and the adjusted probability could be expressed as:

$$p_i' = \frac{\delta p_i}{1 + \delta p_i - p_i} \quad (4)$$

where $p_i'$ is adjusted probability; $\delta$ is sampling rate, for example, the sampling rate of under-sampling the imbalanced dataset (around 1:16,000) to relatively balanced dataset (1:4) is 1/4000=0.00025. Most of the adjusted probabilities are very small, even lower than 0.002, therefore, all the adjusted probabilities are multiplied by 100 to generate the risk score (ranges from 0 to 100) in the system.

Deep Learning Algorithm

Figure 8:
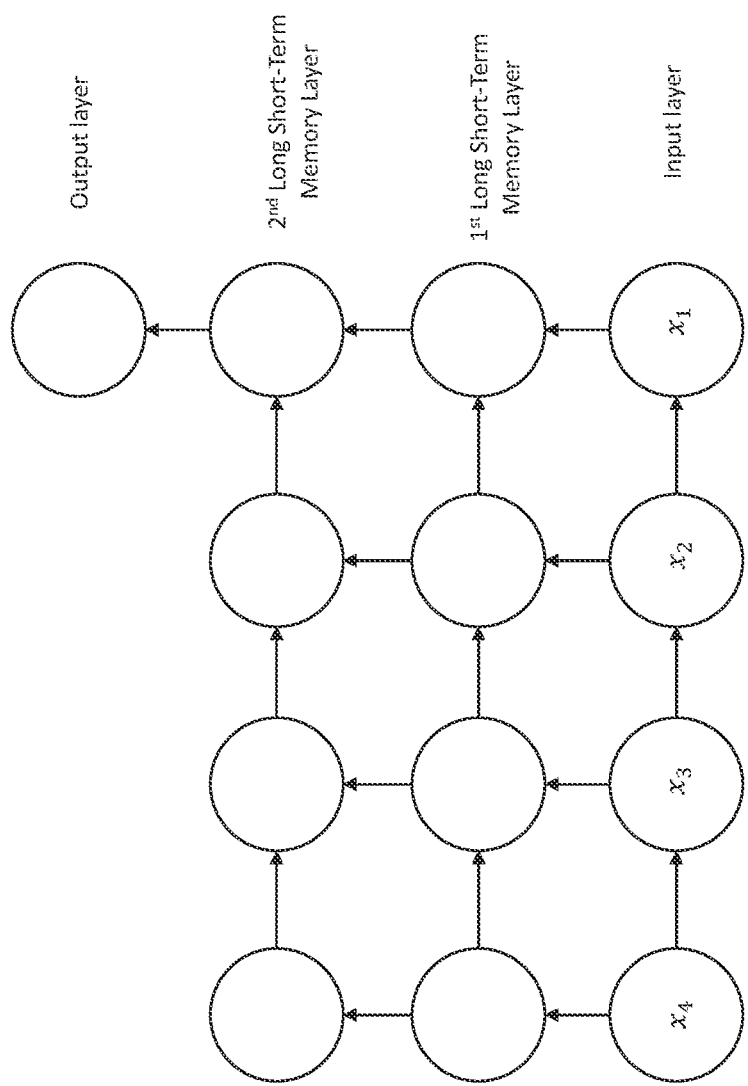
FIG. 8 is an example of a long short-term memory deep learning algorithm architecture.

Long Short-Term Memory (LSTM) is selected as an example here to illustrate the usage and strength of deep learning algorithms. The LSTM addresses the long-term dependency problem by introducing a memory cell which is able to preserve state over long periods of time (Yuan, et al., 2019). A multilayer LSTM was developed to predict the crashes during the next 5-10 minutes based on sequence inputs. As shown in FIG. 8, four input vectors for four time slices are mapped to a probability vector at the output layer for identification. The hidden state of the LSTM unit in the first LSTM layer is used as input to the LSTM unit in the second LSTM layer in the same time step (Graves, et al., 2013). With respect to the deployment of LSTM, the over-sampling design may also result in biased predicted probability. Therefore, the adjusted probability is calculated for every prediction output, which is consistent with the above-mentioned statistical models.

Hybrid Algorithms

Hybrid algorithms have been widely used to combine two or more algorithms to improve the model performance. Generally, there are three kinds of hybrid, or ensembling, techniques: simple/weighted averaging, bagging, and boosting. At this stage, the model averaging was employed in this system to combine the prediction results from both statistical models and deep learning algorithms.

Data Preparation for Model Calibration

In addition to three crash prediction models for freeways (freeway basic segments, weaving segments, and ramps) which were developed in previous research (Shi & Abdel-Aty, 2015; Wang, Abdel-Aty, et al., 2015; Wang, Shi, et al., 2015), seven models are newly calibrated in the data preparation stage. More specifically, four crash prediction models (two statistical models and two deep learning models) were developed for arterial segments and intersections. In addition, three crash severity models were calibrated based on real-time traffic data for freeway segments, arterial segments, and intersections. Table 2 summarizes sample information about the abovementioned models regarding the number of locations, sample size, analysis period, final input variables, and all the utilized real-time data sources.

TABLE 4

| Crash Cost by Severity Type | | |
|---|---|---|
| Severity | Crash Cost (2001 USD) | Crash Cost (2019 USD) |
| Fatal | $4,008,900 | $5,784,843 |
| Injury | $82,600 | $119,192 |
| Property Damage Only | $7,400 | $10,678 |

Historical High-Risk Frequency

The historical frequencies of high-risk facilities are aggregated for a previous week and updated every day. In the system, five levels of aggregation (i.e., half hour, AM peak, PM peak, daytime non-peak, and nighttime) are plotted to show the characteristics of historical crash prediction results, which can be used to validate the crash prediction results with the actual historical crash data. It also helps decision makers visualize a summary of the real-time predictions together with other components of the system to better identify the recurrent safety problems.

Proactive Traffic Management System (PATM)

The system takes the predicted crash-prone locations provided by the ensembled algorithms as the input and provides pro-active traffic management strategies as the output. The PATM algorithm is initialized by human domain knowledge. The PATM strategy implementation history and regional/network implementation report is illustrated by the recommendations from the algorithm due to the lack of historical implementation data. A new module, PATM device installation guidance, is also developed to guide decision makers to the preferable locations to install new PATM devices.

Figure 9:
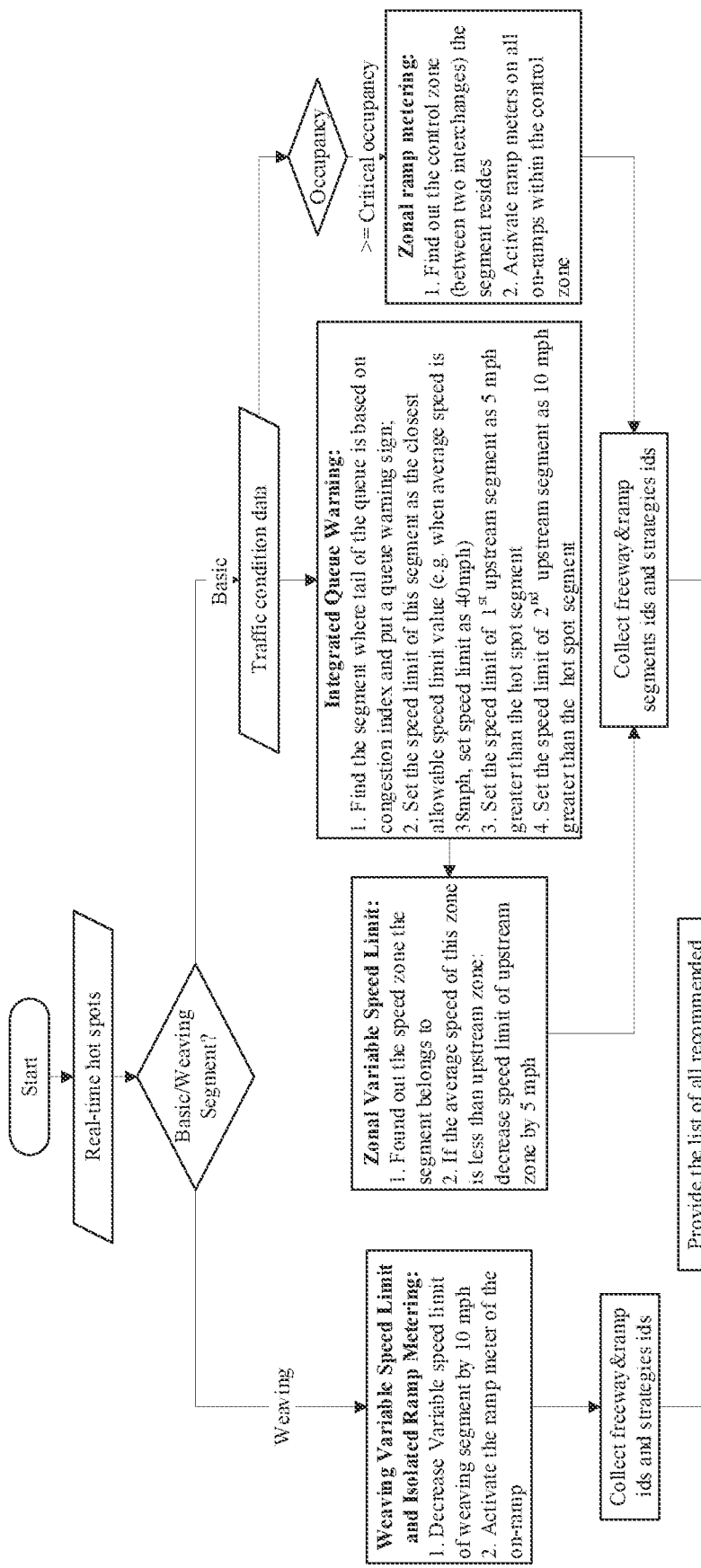
FIG. 9 is a process flow diagram depicting a structure of a proactive traffic management system in accordance with an embodiment of the present invention.

Over ten research studies regarding the safety and operation benefits of PATM strategies are evaluated and four of them are selected to serve as initialization. They are Zonal Variable Speed Limit (Abdel-Aty et al., 2008), Zonal Ramp Metering (Abdel-Aty and Gayah, 2010) and Integrated Queue Warning for freeway basic segments, as well as Integrated Variable Speed Limit and Isolated Ramp Metering (Wang et al., 2017) for freeway weaving segments. Their logics are integrated into a decision tree, as depicted in FIG. 9, which is a simplified illustration of its work flow. Traffic condition and roadway geometric design of the high-risk locations, as well as the roadway network topology, are collected as the input of the algorithm. Then, the algorithm selects the countermeasure(s) based on several rules abstracted from our previous research. Finally, a list of countermeasures and its recommended implementation locations are provided to operators.

The system also tracks the history of the implementations of PATM strategies and provides a visualization of locations where the problem and countermeasure are repeated frequently. The locations are visualized as icons on a map which illustrates the frequency of high-risk events. Suggestions to decision makers are provided to repeat the solution at the same location(s) automatically for certain time periods to pro-actively alleviate the risk. The decision makers are also able to download a summary report of the suggestions. The report contains the detailed information of segment name, strategy type and historical implementation frequency of the last seven days. It is noted that since there is no actual historical implementation data, this function is illustrated using the real-time recommendations by PATM system as the implementation.

When there is no existing PATM device (e.g., queue warning signs) for a certain high-risk location but the system frequently recommends a certain PATM countermeasure, installing a new device might be recommended to the decision maker to improve road safety. This function is especially useful if the transportation agency has plans to deploy new PATM/ATM devices. It visualizes where and what devices need to be installed on the similar map used by implementation history. The decision makers could download the guidance, which is similar to the historical implementation report, as well.

Historical Crash Diagnostics

Figure 10:
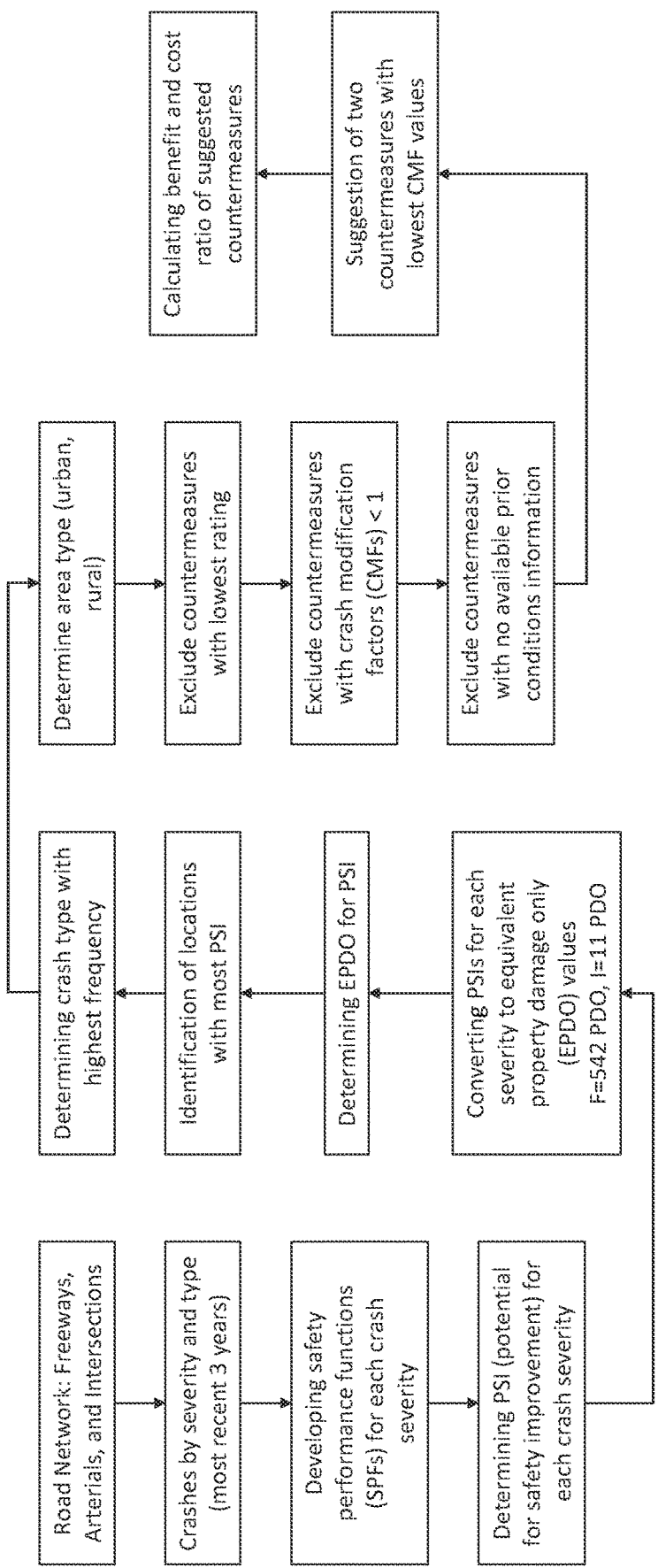
FIG. 10 is a flowchart depicting historical crash diagnostics and the resulting calculation of benefit and cost values associated with countermeasures proposed by an embodiment of the system.

FIG. 10 depicts a flowchart of the historical decision support function. One of the most important services that the decision safety support system (DSSS) offers is the selection of the most efficient countermeasure(s) and its respective effect to improve safety on the roadway hotspots utilizing more than 6000 options based on the data inputs. Based on the crash data for the road network, identification of locations with the most potential for safety improvement (PSI) process is conducted by the system to identify these locations along with the most problematic crash type. The roadway network was divided into three roadway facilities; freeways, arterials, and intersections. Crashes by severity and types for the most recent three years are collected at each roadway facility to use in this process.

Safety performance functions (SPFs) were developed for each crash severity to predict crashes at these roadway facilities as one of the requirements in the process of identification of locations (i.e., segments and intersections) with the most potential for safety improvement. By using the "Excess Expected Average Crash Frequency with EB Adjustments" method (HSM 2010), the system calculates PSIs by crash severity for each roadway facility. Then, PSIs of fatal and injury crashes are converted to equivalent property damage only (PDO) PSIs. Based on the equivalent PDO PSIs, locations with the highest PSI values (such as the highest 10%) are identified by the system for each roadway facility. Crash types with the highest frequency at each of these identified high PSI locations are determined by the expert system, which then selects the most relevant and appropriate countermeasure(s) that would be advised by the system for implementation. This process could easily be adjusted based on the users' preference (e.g., consider only fatal crashes, or use the top 5% instead of 1%).

Suggestion of Optimal Countermeasure

The countermeasures' database used for the suggested countermeasure consists of more than 6,000 countermeasures for different facility types (i.e., freeways, arterials, and intersections) and crash types. First, the system categorizes all the countermeasures into groups based on the facility type, area type (i.e., urban and rural), and crash type. Then for each group, the system filters the countermeasures to keep only the ones with high star rating (i.e., 3-5 stars), with crash modification factors (CMFs) significantly lower than 1 and the base map has available data for their prior conditions. Finally, two countermeasures which have the lowest and second lowest CMFs are selected for each group. Then, the decision safety support system can suggest the most effective countermeasures for each identified hotspot crash location based on its attributes (i.e., facility type, area type, and problematic crash type).

Benefit Estimation

After the system suggests to the user the appropriate countermeasure, it can also calculate the benefit associated with applying it. This calculation is based on the reduced number of crashes for each severity type. For this purpose, the crash severity distribution for each facility and the problematic crash type are determined as shown in Table 3, depicted in FIG. 11. Also, the crash cost values were acquired as shown in Table 4 below, with the cost values being adjusted from 2001 US dollar values to current values based on average annual inflation rates.

TABLE 2

Newly Calibrated Models

| Facility Type | Algorithm Type | Number of Locations | Analysis Period | Sample Size after Sampling | Final Input Variables | Real-Time Data Sources |
|---|---|---|---|---|---|---|
| Arterial segment | Statistical model Deep learning | 106 segments | Jan. 2017- May 2018 | Crash event: 758 Non-crash events: 3,032 Crash event: 9,606,784 Non-crash events: 9,606,784 | 1. Average speed 2. Standard deviation of speed 3. Downstream green ratio 4. Upstream volume 5. Upstream green ratio 6. Weather type 7. Visibility | BlueTOAD ®, ATSPM (Automated Traffic Signal Performance Measures), QCLCD (Quality Controlled |

TABLE 2-continued

Newly Calibrated Models

| Facility Type | Algorithm Type | Number of Locations | Analysis Period | Sample Size after Sampling | Final Input Variables | Real-Time Data Sources |
|---|---|---|---|---|---|---|
| Intersection | Statistical model Deep learning | 54 intersections | | Crash event: 813 Non-crash events: 3,252 Crash event: 16,305,841 Non-crash events: 16,305,841 | 1. Average speed on major approaches 2. Standard deviation of speed on major approaches 3. Volume on major approaches 4. Green ratio on major approaches 5. Volume on minor approaches 6. Green ratio on minor approaches 7. Precipitation 8. Visibility | Local Climatological Data) |

The following equation is used to calculate the benefit of applying each suggested countermeasure:

$$\text{Benefit} = \text{No. Crashes} * (1-\text{CMF}) * (\%\text{Fatal} * \text{Cost}_{Fatal} + \%\text{Injury} * \text{Cost}_{injury} + \%\text{PDO} * \text{Cost}_{PDO}) \quad (5)$$

where Benefit is the benefit of applying the suggested countermeasure in USD, No. Crashes is the number of crashes for the type associated with the suggested countermeasure, CMF is the crash modification factor of the suggested countermeasure, % Fatal is the percentage of fatal crashes in the crash severity distribution, and $\text{Cost}_{Fatal}$ is the cost of one fatal crash in USD. In addition to the benefit calculation, the cost of implementing the suggested countermeasure was calculated to determine the benefit/cost ratio for each suggested countermeasure.

System Visualization

The visualization system is a web-based tool, which could be accessed by different types of users, which include specific users (i.e., operators/short-term decision makers, policy makers/influencers) and public users. The access permissions of specific users could be different according to the user type, and some functions could only be available for specific users. The access permission for each component could be customized based on the agency's requirements before deploying.

Figure 12:
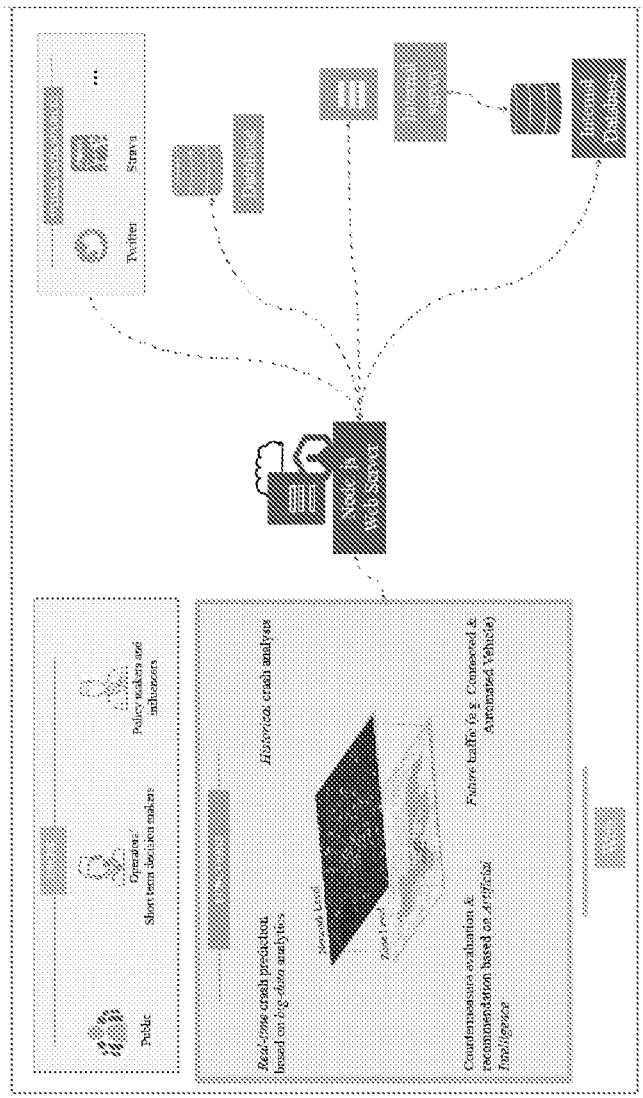
FIG. 12 depicts an embodiment of a system architecture.

The web-system includes 4 main functions: real-time crash prediction based on big data analytics, historical crash analysis for policy makers/influencers and possibly partially the public, countermeasure evaluation & recommendation based on Artificial Intelligent (AI), and the ability to adapt for future traffic systems that include connected and automated vehicles (CAV). The detailed information for the 4 components will be explained in the following sections. As shown in FIG. 12, the users send requests in the front-end to the Node.js web server, which provides the bulk of the functions of the system. The web server runs the functions in the back-end based on the data from the database(s). After processing all data, the web server sends the safety results data to the front-end.

For the front-end of the tool, the system uses Angular™ as the JavaScript® Framework, and uses Bootstrap™ as the front-end component library. The safety data and the extensive work of traffic safety analysis are visualized by interactive maps, advanced graphics and animation on the user interface. Microscopic traffic simulation has been used extensively to validate and test the real-time safety risk algorithms under many conditions and scenarios. The interactive maps in the visualization tool are developed based on google map JavaScript® API, and the KML (keyhole markup language) files that include zone and roadway information are displayed using geoxml3.js on maps. Chart.js is deployed to illustrate the trends in the safety data by various types of visualization figures. Meanwhile, animation functions are also available for some of the figures in the system by jquery.min.js.

For the back-end of the system, Node.js is used as the server environment and the PostgreSQL® database management system is used as the database environment. The tool is ready to connect to the internal databases of individual jurisdictions to obtain real-time data (e.g., traffic data, weather data) and other public data sources from DOT (Department of Transportation) systems, which could be customized according to the needs of the agency and the characteristics of local data sources. By employing internal databases, the system significantly reduces data security risk of the agencies and the cost of hardware (e.g., database). Moreover, a new database may be built if more data sources are needed (e.g., social network data) or no internal database is available for a given area.

The system includes three main webpages for each type of users (i.e. operator, decision maker, public user). For each of the main webpages, an interactive map is included as the primary window, while the analysis tools (e.g. drop-down lists, figures, AI recommendations) are located at the left side of the user interface to display more information. The detailed information for the user interface design is included in the following sections.

Figure 13A:
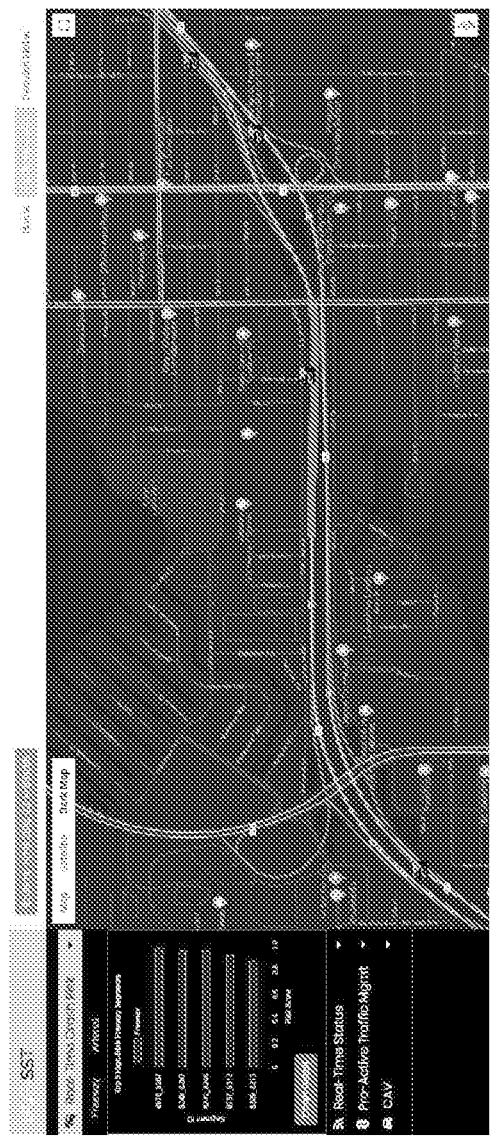
FIG. 13A depicts an embodiment of a real-time traffic management system, showing a dynamic screening of high-risk segments of a base map.
Figure 13B:
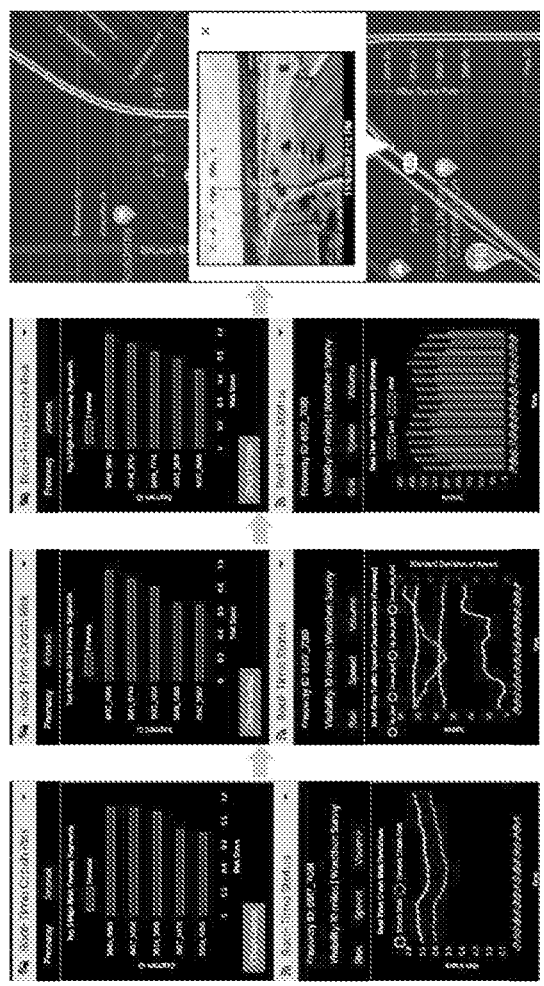
FIG. 13B depicts an embodiment of a real-time traffic management system, showing traffic characteristics for a given location.

In a specific example of a visualization system, depicted in FIGS. 13A-13B, the system provides the top five high-risk segments, which are dynamically screened. The bar chart in the left shows the top five high-risk freeway segments with the predicted real-time risk scores. If operators click one of the five bars, the map will zoom on the selected segment. As can be seen in FIGS. 13A-B, the selected high-risk freeway segment is a curve segment connected with a major arterial by an on-ramp. Similarly, the system also provides dynamically screened top five high-risk arterial segments once operators switch the tab to "Arterial".

To monitor the real-time traffic safety conditions, as well as the traffic status of the selected segment, operators could click the "Real-Time Status" tab, and then the real-time risk, speed, and volume characteristics could be visualized. The bottom left line chart in FIG. 13B shows the real-time crash risk and severe crash risk of a selected segment, which indicates that the crash risk starts to increase from the timestamp 130 minutes.

Operators can select the "Speed" tab to check the real-time speed characteristics. As shown in the second line chart in FIG. 13B, the real-time upstream average speed, upstream speed standard deviation, downstream average speed, and downstream speed standard deviation of the selected segment are visualized. The upper two lines indicate the average speed and speed standard deviation of the upstream detector, and the bottom two lines indicate the same speed characteristics of the downstream detector. The figure shows that the average speed and speed standard deviation of the upstream detector are much higher than that of the downstream detector, which implies that the vehicles on this segment should decrease their speed rapidly to reach the downstream segment. Moreover, the speed difference between upstream and downstream detectors starts to increase from the timestamp 130 minutes, which decreased the road safety conditions. It is well accepted that turbulent traffic with high SD of speed increases the likelihood of a crash to occur, while increasing the speed increase the conditional probability of a severe crash. Both measures could be combined to calculate the Coefficient of Variation of Speed (CVS). Speed differential between lanes or up and downstream also have negative impacts on road safety.

With respect to the traffic volume, both upstream and downstream volume data are visualized in real-time. The third line chart in FIG. 13B presents the difference between upstream and downstream volumes, which shows that the downstream station is more congested than the upstream station. Also, the difference starts to increase from timestamp 130 minutes, which is consistent with the variation of real-time predictive analysis and speed characteristics. In addition, operators could access the real-time images of the closest CCTV camera, which can visually improve their understanding of the real-time traffic status, as well as the contributing factors that may be related to the unsafe situations. These kinds of visualization outputs could assist the traffic operator to better monitor the real-time traffic safety conditions, as well as understand the reason why the predicted road safety situations change, which could also improve the efficiency and accuracy of the short-term decision-making process.

REFERENCES

Abdel-Aty, M., Cunningham, R., Gayah, V., Hsia, L., 2008. Dynamic Variable Speed Limit Strategies for Real-Time Crash Risk Reduction on Freeways. Transp. Res. Rec. J. Transp. Res. Board 2078, 108-116. doi:10.3141/2078-15

Abdel-Aty, M., Gayah, V., 2010. Real-Time Crash Risk Reduction on Freeways Using Coordinated and Uncoordinated Ramp Metering Approaches. J. Transp. Eng. 136 5, 410-423. doi:10.1061/(ASCE)TE.1943-5436.0000100

Duarte, G. O., Gonçalves, G. A., Farias, T. L., 2013. Vehicle monitoring for driver training in bus companies—Application in two case studies in Portugal. Transportation Research Part D: Transport and Environment 18, 103-109.

Dal Pozzolo, A., Caelen, O., Johnson, R. A., & Bontempi, G. (2015). Calibrating probability with undersampling for unbalanced classification. In 2015 *IEEE Symposium Series on Computational Intelligence* (pp. 159-166): IEEE.

Graves, A., Mohamed, A.-r., & Hinton, G. (2013). Speech recognition with deep recurrent neural networks. In *Acoustics, speech and signal processing (icassp)*, 2013 ieee international conference on (pp. 6645-6649): IEEE.

Shi, Q., & Abdel-Aty, M. (2015). Big Data applications in real-time traffic operation and safety monitoring and improvement on urban expressways. *Transportation Research Part C: Emerging Technologies*, 58, 380-394.

Wang, L., Abdel-Aty, M., Shi, Q., & Park, J. (2015). Real-time crash prediction for expressway weaving segments. *Transportation Research Part C: Emerging Technologies*, 61, 1-10.

Wang, L., Shi, Q., & Abdel-Aty, M. (2015). Predicting crashes on expressway ramps with real-time traffic and weather data. *Transportation Research Record: Journal of the Transportation Research Board*, 32-38.

Wang, L., Abdel-Aty, M., Lee, J., 2017. Implementation of Active Traffic Management Strategies for Safety on Congested Expressway Weaving Segments. Transp. Res. Rec. 2635 1, 28-35. doi:10.3141/2635-04

Yuan, J., & Abdel-Aty, M. (2018). Approach-Level Real-Time Crash Risk Analysis for Signalized Intersections. *Accident Analysis & Prevention*, 119, 274-289.

Yuan, J., Abdel-Aty, M., Gong, Y., & Cai, Q. (2019). Real-Time Crash Risk Prediction Using Long Short-Term Memory Recurrent Neural Network. In *Transportation Research Record: Journal of the Transportation Research Board* (Vol. 3414). Washington D.C.

Yuan, J., Abdel-Aty, M., Wang, L., Lee, J., Yu, R., & Wang, X. (2018). Utilizing bluetooth and adaptive signal control data for real-time safety analysis on urban arterials. *Transportation Research Part C: Emerging Technologies*, 97, 114-127.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of automatically and proactively managing traffic patterns, the method comprising the steps of:
   receiving, on a central server, and aggregating, via the server, a plurality of real-time data including traffic data and weather data, the plurality of real-time data relating to a segment of a traffic system;
   building a base map displaying the segment of the traffic system;
   overlaying graphical depictions of the plurality of real-time data on the base map;
   identifying, based on the graphical depictions, one or more likely areas of the base map that represent a likelihood of a traffic event by:
      calculating a statistical likelihood of a plurality of traffic events based on a statistical model selected from group consisting of a binary logistic model, a conditional logistic model, a Bayesian conditional logistic model, a Bayesian random parameter/effect logistic model and a combination of thereof;

calibrating the statistical model using an under-sampling method to reduce a sample size of a plurality of non-traffic events;

simultaneously utilizing a long short-term memory model to identify a pattern-based likelihood of the traffic event;

training, retraining, or both, the long short-term memory model using an oversampling method to increase the sample size of the plurality of traffic events; and combining a result of the statistical likelihood of the traffic event with a result of the long short-term memory model to generate a hybrid model representing the likelihood of the traffic event on the base map;

outputting at least one alteration of a traffic route to reduce the likelihood of the traffic event by:

utilizing the hybrid model as an input to a calculation of the at least one alteration;

fitting a plurality of countermeasures stored in a database over the base map;

calculating a difference between each of the plurality of countermeasures and the hybrid model by subjecting each of the plurality of countermeasures to one or more virtual simulations; and selecting at least one of the plurality of countermeasures as the at least one alteration of the traffic route to reduce the likelihood of the traffic event; and graphically displaying the at least one alteration of the traffic route on the base map.

2. The method of claim 1, wherein the plurality of real-time data further comprises social media data captured within an area defined by the segment of the traffic system.

3. The method of claim 1, wherein the plurality of real-time data further comprises closed circuit television data captured within an area defined by the segment of the traffic system.

4. The method of claim 1, wherein the plurality of real-time data further comprises global positioning system data captured within an area defined by the segment of the traffic system.

5. The method of claim 1, further comprising the step of filtering the plurality of real-time data prior to the step of building the base map.

6. The method of claim 5, further comprising the steps of processing the plurality of real-time data and processing the filtered plurality of real-time data prior to the step of building the base map.

7. The method of claim 1, wherein the at least one alteration includes a step of changing a speed limit of the traffic system.

8. The method of claim 1, further comprising the step of calculating, for at least one of the plurality of countermeasures, an estimated monetary benefit of implementing the at least one of the plurality of countermeasures within the segment of the traffic system.

9. A proactive method of managing traffic patterns, the method comprising the steps of:

receiving, on a central server, and aggregating, via the server, a plurality of real-time data including traffic data, weather data, and social media data, the plurality of real-time data relating to and captured from a segment of a traffic system;

overlaying graphical depictions of the plurality of real-time data on a base map representing the segment of the traffic system;

identifying, based on the graphical depictions, one or more likely areas of the base map that represent a likelihood of a traffic event by:

calculating a statistical likelihood of a plurality of traffic events based on a statistical model selected from a group consisting of a binary logistic model, a conditional logistic model, a Bayesian conditional logistic model, a Bayesian random parameter/effect logistic model and a combination of thereof;

calibrating the statistical model using an under-sampling method to reduce a sample size of a plurality of non-traffic events;

simultaneously utilizing a deep learning model to identify a pattern-based likelihood of the traffic event, the deep learning model selected from the group consisting of an artificial neural network, a recurrent neural network, and a long short-term memory model;

training, retraining, or both, the deep learning model using an oversampling method to increase the sample size of the plurality of traffic events; and combining a result of the statistical likelihood of the traffic event with a result of the deep learning model to generate a hybrid model representing the likelihood of the traffic event on the base map;

outputting at least one alteration of a traffic route to reduce the likelihood of the traffic event by:

utilizing the hybrid model as an input to a calculation of the at least one alteration;

fitting a plurality of countermeasures stored in a database over the base map;

calculating a difference between each of the plurality of countermeasures and the hybrid model by subjecting each of the plurality of countermeasures to one or more virtual simulations; and selecting at least one of the plurality of countermeasures as the at least one alteration of the traffic route to reduce the likelihood of the traffic event; and graphically displaying the at least one alteration of the traffic route on the base map.

10. The method of claim 9, wherein the plurality of real-time data further comprises global positioning system data captured within an area defined by the segment of the traffic system.

11. The method of claim 9, further comprising the step of filtering the plurality of real-time data prior to the step of building the base map.

12. The method of claim 11, further comprising the steps of processing the plurality of real-time data and processing the filtered plurality of real-time data prior to the step of building the base map.

13. The method of claim 9, wherein the at least one alteration is selected from a group consisting of changing a speed limit, changing a traffic signal duration, changing a direction of traffic flow within the segment of the traffic system, and a combination of thereof.

14. The method of claim 9, further comprising the step of calculating, for at least one of the plurality of countermeasures, an estimated monetary benefit of implementing the at least one of the plurality of countermeasures within the segment of the traffic system.

15. A proactive traffic management system comprising:
a data collection server in communication with a first raw data server, wherein the first raw data server receives a plurality of raw data from the data collection server;
a first data filter server in communication with the first raw data server, the first data filter server configured to receive the plurality of raw data from the first raw data server and filter the plurality of raw data to create a plurality of filtered data wherein the first data filter server is configured to calibrate using an under-sampling method the plurality of raw data, whereby at least one non-traffic event is removed from the plurality of filtered data;
an action database server in communication with the first data filter server, wherein the action database server receives the plurality of filtered data from the first data filter server and compares the plurality of filtered data with a plurality of historic data to output a suggested dataset from the plurality of filtered data, wherein the action database server is configured to be trained, retrained, or both, via a deep learning model using an oversampling method to input at least one additional traffic event into the plurality of filtered data;
a second raw data server in communication with each of the action database server and a second data filter server, wherein the second raw data server receives the suggested dataset from the action database server and transmits the suggested dataset to the second data filter server;
a real-time database server including a base map of a segment of a traffic system, the real-time database server in communication with the second data filter server, wherein the real-time database server receives a filtered portion of the suggested dataset from the second data filter server; and
a web server in communication with the real-time database server, the web server including a graphical user interface having a real-time display controller that is configured to receive an input from a user, wherein the web server receives a final dataset from the real-time database, the final dataset including one or more real-time data points related to the segment of the traffic system, and wherein the web server displays the final dataset overlayed on the base map,
wherein the final dataset is overlayed on the base map, whereby the base map is configured to displays at least one alteration of the traffic route, thereby improving a traffic pattern thereof.

* * * * *